United States Patent [19]

Kelsall

[11] 3,912,394
[45] Oct. 14, 1975

[54] METHOD AND SYSTEM OF INTERFEROMETRIC MEASUREMENTS OF MODULATION TRANSFER FUNCTIONS

[75] Inventor: Dennis Kelsall, Concord, Mass.

[73] Assignee: Massachusetts Institute of Technology, Cambridge, Mass.

[22] Filed: June 6, 1974

[21] Appl. No.: 477,108

[52] U.S. Cl. .............................................. 356/113
[51] Int. Cl.² ........................................ G01B 9/02
[58] Field of Search ........................ 356/113, 106 R

[56] References Cited
UNITED STATES PATENTS
3,218,916  11/1965  Saunders............................ 356/113

OTHER PUBLICATIONS
"A Wavefront Shearing Interferometer", by W. J. Bates, Proc. of Physical Soc. of London, Vol. 59, 1947, pp. 940-950.
"A Simplified Shearing Interferometer" by R. L. Drew, Proc. of Physical Soc. of London, Vol. 64, 1951, pp. 1005-1010.

Primary Examiner—Ronald L. Wibert
Assistant Examiner—Paul K. Godwin
Attorney, Agent, or Firm—Arthur A. Smith, Jr.; Martin M. Santa; Robert Shaw

[57] ABSTRACT

A triangular interferometric system using a continuously rotating micrometer plate for altering the path lengths of the light beams and producing equal but opposite lateral displacement. A collimated beam passes through an aperture to a beam splitter which produces two beams that impinge upon separate mirrors and then are reflected to opposite mirrors where they are reflected a second time and strike the beam splitter at the same point forming a single beam which is detected by a photomultiplier. At the point of intersection between the two mirrors is a continuously rotating micrometer plate that adjust the path lengths of the beams.

4 Claims, 2 Drawing Figures

METHOD AND SYSTEM OF INTERFEROMETRIC MEASUREMENTS OF MODULATION TRANSFER FUNCTIONS

BACKGROUND OF THE INVENTION

The invention herein described was made in the course of work performed under a contract with the Electronic Systems Division, Air Force Systems Command, United States Air Force.

This invention relates to the measurement of modulation transfer functions, and more particularly to a triangular interferometric system.

Previous modulation transfer function measurements, using a corner-cube shearing interferometer, have been carried out from jet aircrafts flying at anormal altitude and speed. The nature of imaging through the atmosphere is such that the modulation transfer function is rapidly changing from one instant to the next, and from an airborne platform the changes may occur as fast as 1 msec. Hence, it is desirable to have a modulation transfer function measuring system that can obtain the complete curve (for all shear values or spatial frequencies) in a very short time and close to 1 msec. Therefore, for future airborne experiments, a new, continuously shearing and scanning-type interferometric system has been designed which employs the triangular interferometric configuration. However, unlike previous triangular interferometers which employ polarization techniques, the present invention uses a less complicated path-changing operation. Both the shearing and path-changing effects in the new interferometer are produced simply by continuous rotation of the micrometer plate. In this way, the discontinuities and nonlinearities associated with the piezoelectrically scanned interferometer are avoided. A smooth, continuous, constant-frequency carrier signal is generated as the shear is continuously varied, which allows better narrow-band electronic filtering, and consequently, better signal-to-noise ratios at the high shear values.

SUMMARY OF THE INVENTION

The present invention is a novel interferometric method and system for measuring the modulation transfer function and is much less complicated than the previous techniques employed and is capable of very fast monitoring of the complete modulation transfer function curve. The curve can be obtained with a scan rate less than 1 msec and is therefore ideally suited to both airborne and ground-based atmospheric modulation transfer function measurements.

It is therefore an object of this invention to provide a system for measuring modulation transfer functions that avoid discontinuities and nonlinearities.

It is another object to provide an interferometric method of fast monitoring of the complete modulation transfer function curve.

It is still another object to provide an interferometric method suitable for both airborne and ground based atmospheric modulation transfer function measurements in both the visible and infrared spectrum.

These and other objects, features and advantages of the invention will become more apparent from the following description taken in connection with the illustrative embodiment in the accompanying drawings.

DETAILED DESCRIPTION OF THE PREFERRED EMBODIMENT

Figure 1:
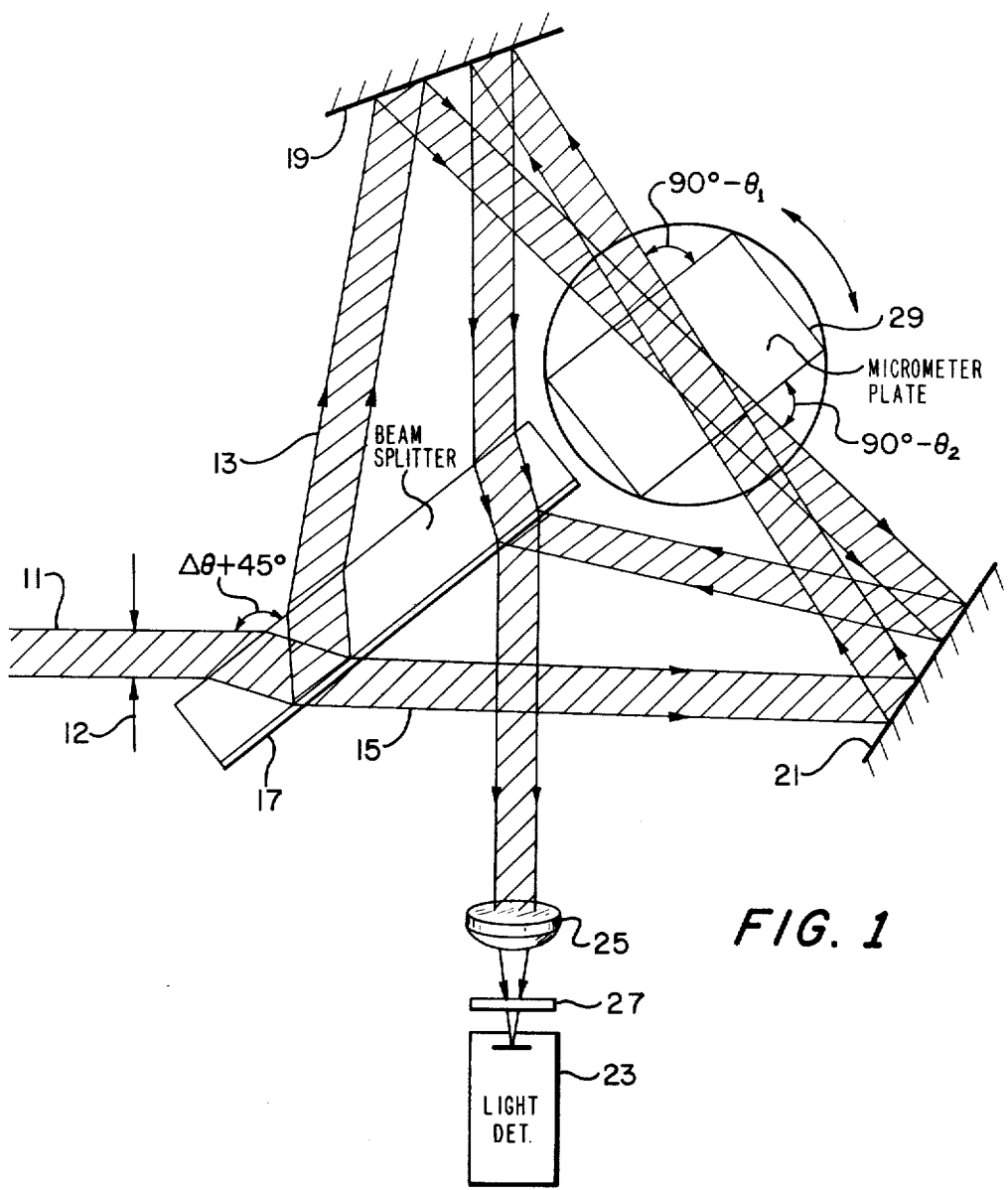
FIG. 1 is an optical schematic diagram showing an embodiment of the triangular interferometer.

Referring to FIG. 1 which shows an optical schematic of the triangular interferometer, an incident collimated beam 11, such as light from a laser transmitted through the atmosphere being investigated, enters through aperture 12. Beam 11 is divided into two parts, 13 and 15, at beam splitter 17 and then each beam 13 and 15 traverses a triangular path in opposite directions striking reflecting surfaces of mirrors 19 and 21 and are recombined and interfere at the beam splitter 17. The light is subsequently directed to a radiation detector or photomultiplier 23 via lens 25 and diffuser 27 which are in optical alignment. Micrometer plate 29 is rotated through an angle $\theta$ through a normal symmetrical position. This both changes the path length each beam traverses through the interferometer and produces equal but opposite amounts of lateral displacement or shear of the two beams. Initially adjust the direction of the input beam which enters the interferometer so that it is incident exactly at 45° to the beam splitter 17, such that the two beams passing through the micrometer plate are exactly parallel and collinear. For each beam, as the micrometer plate is rotated from the normal through an angle $\theta$, the total path change is given by $$\Delta = (\mu - 1) t + \frac{(\mu - 1) t}{2\mu} \theta^2$$

where $\mu$ is the refractive index, $t$ is the plate thickness, and $\theta$ is the angle between the normal to the plate and the beam traversing it. Next adjust the direction of the input beam 11 which enters the interferometer so that it is incident at an angle $(45° + \Delta\theta)$ to the beam splitter plate. Now the two beams traversing the micrometer plate are not parallel, but as shown in FIG. 1, each makes a slightly different angle to the normal, $\theta_1$ and $\theta_2$, respectively, then the path change in each case is not equal but depends on the angle $$\Delta\theta = \theta_1 - \theta_2$$

beam 1: $\Delta_1 = (\mu - 1) t + \frac{(\mu - 1)}{2\mu} t \theta_1^2$ beam 2: $\Delta_2 = (\mu - 1) t + \frac{(\mu - 1)}{2\mu} t \theta_2^2$ Therefore, the relative difference in path length for the two beams is given by $$\Delta = \Delta_1 - \Delta_2 = \frac{(\mu - 1) b}{2\mu} (\theta_1^2 - \theta_2^2)$$

$$\Delta = \frac{(\mu - 1) t}{2\mu} (\theta_1 + \theta_2)(\theta_1 - \theta_2).$$

If the micrometer plate is rotated continuously and uniformly, the path mismatch in the two beams varies linearly with the angle of rotation since $(\theta_1 - \theta_2)$ is constant. The relative shear (lateral displacement of the two beams) is given by $$s = 2 \frac{(\mu - 1)t}{2\mu} \frac{1}{n} (\theta_0 + \theta_2),$$

where $h$ = beam diameter. Therefore, both shear and path differences vary linearly with $(\theta_1 + \theta_2)$. As the micrometer plate is rotated, the output signal (measuring the total light in the interferogram) consists of a constant-frequency carrier signal, whose amplitude is modulated continuously. This output signal traces directly the complete modulation transfer function curve and can be recorded on tape and displayed visually in real time on an oscilloscope.

Figure 2:
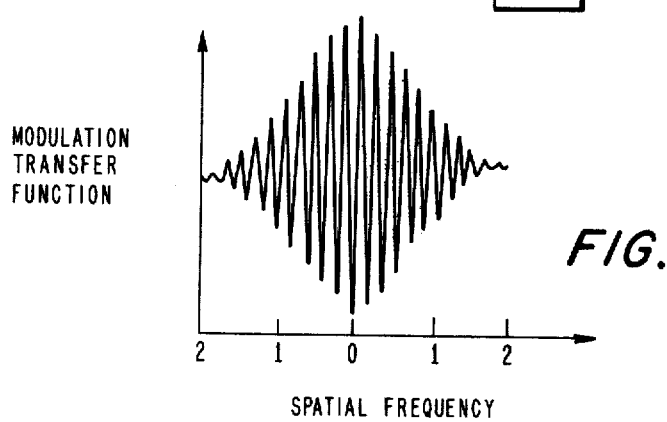
FIG. 2 is a graph of the modulation transfer function plotted against spatial frequency.

The micrometer plate can be continuously rotated by a small motor. The display on the oscilloscope for a 10 MM diffraction-limited circular aperture is shown in FIG. 2. For each rotation of the micrometer plate, the complete modulation transfer function (from $s = 0$ to $s = 2$) is obtained four times. Part of the scanning time must necessarily be dead time. In practice, the parameters are chosen so that a complete modulation transfer function curve is traced as the micrometer plate is rotated through about 20°. Hence, for each rotation, approximately 75 percent of the time is dead time. The display shown in FIG. 2 corresponds very closely to the diffraction-limited curve for a clear aperture, the time scale being about 1 msec for the complete modulation transfer function curve. In the laboratory, rotating the micrometer plate at 3600 rpm, the complete modulation transfer function curve has been measured in roughly 1.25 msec. The carrier signal in this case was somewhere between 10 kHz and 100 kHz. (This depends on $\theta_1 - \theta_2$).

This new method and system is well suited to extension to infrared measurements up to 10 microns, if the micrometer plate and the beam splitter are chosen to be of a suitable material for this wavelength region, and an infrared detector used. In this case, because of the longer wavelengths and other paremeters, the maximum useful scan rate may be somewhat less than that in the visible version of this interferometer.

Nevertheless, the data gathering capability of this new technique exceeds any other known modulation transfer function measuring system and is amendable to relatively simple digitization and computer processing operations. The triangular interferometer can be ruggedized and capable of operating from any airborne platform. Because of the less complicated optical components, it is more compact than the previous systems and does not require any internal adjustments during use.

The phase transfer function can be measured from the output signal from the interferometer, by monitoring the instantaneous frequency at each position on the spatial frequency axis (or more exactly the phase of each cycle of the electrical signal is a meaure of the phase transfer function at each shear point on the MTF scale.)

The apparatus may also be used with a white light source, (or other non-laser source) providing certain coherence limitations are satisfied, (such as by using a narrow band spectral filter, and keeping the source size small).

What is claimed is:

1. An interferometric system for modulation transfer function measurements comprising:
   a. a source of collimated light;
   b. a beam splitter in the path of the collimated light and dividing the light into first and second beams;
   c. a first reflecting surface in the path of the first beam;
   d. a second reflecting surface in the path of the second beam, the first and second reflecting surfaces being positioned to reflect the beams to other of the reflecting surfaces causing the paths of the beams to intersect, and the second reflection causing the beams to converge at the beam splitter and form a single recombined beam;
   e. means positioned at the intersection of said beams for changing the path length and the shear of the first and second beams; and
   f. means for detecting the single recombined beam.

2. An interferometric measuring system according to claim 1 wherein the path lengthening means is a continuously and uniformly rotating micrometer plate.

3. An interferometric measuring system according to claim 2 wherein the detecting means comprises:
   a. a lens in optical alignment with the single combined beam;
   b. a diffuser in optical alignment with the lens; and
   c. a photomultiplier positioned to receive light from the diffuser.

4. An interferometric method for measuring modulation transfer function comprising:
   a. splitting a collimated light beam into two separate light beam paths;
   b. reflecting firstly the two separate light beam paths to a micrometer plate with each path incident to the micrometer plate at predetermined angles;
   c. rotating the micrometer plate continuously and uniformly;
   d. reflecting secondly the two separate light beam paths to a common point, recombining the two separate light beam paths at the common point to form a single recombined beam; and
   e. detecting the recombined beam.

* * * * *